US010425503B2

(12) United States Patent
Fox et al.

(10) Patent No.: US 10,425,503 B2
(45) Date of Patent: Sep. 24, 2019

(54) SHARED PENDING INTEREST TABLE IN A CONTENT CENTRIC NETWORK

(71) Applicant: CISCO TECHNOLOGY, INC., San Jose, CA (US)

(72) Inventors: Kevin C. Fox, San Jose, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 473 days.

(21) Appl. No.: 15/093,631

(22) Filed: Apr. 7, 2016

(65) Prior Publication Data

US 2017/0295261 A1 Oct. 12, 2017

(51) Int. Cl.
| | | |
|---|---|---|
| *H04L 12/00* | (2006.01) | |
| *G06F 13/00* | (2006.01) | |
| *H04L 29/06* | (2006.01) | |
| *G06F 17/30* | (2006.01) | |
| *H04L 29/08* | (2006.01) | |

(52) U.S. Cl.
CPC ........ *H04L 67/42* (2013.01); *G06F 17/30377* (2013.01); *H04L 67/10* (2013.01); *H04L 67/28* (2013.01)

(58) Field of Classification Search
CPC ....... H04L 45/742; H04L 45/42; H04L 51/00; H04L 51/04
USPC ........................................ 709/203, 206, 207
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

RTMP (2009). Available online at http://wwwimages.adobe.com/ www.adobe.com/content/dam/Adobe/en/devnet/rtmp/ pdf/rtmp specification 1.0.pdf.

(Continued)

*Primary Examiner* — Frantz Coby

(57) ABSTRACT

One embodiment provides a pending interest table (PIT) sharing system that facilitates sharing of a PIT. During operation, the system receives, by a local interface, a first message comprising an interest from a node of origin. The hop count for the interest has not been decreased. The system creates an entry, which includes a name of the interest, in a PIT for the interest. If the system receives a content object associated with the name, the system retrieves and removes the entry from the PIT, and sends the content object to the node of origin in a second message.

20 Claims, 12 Drawing Sheets

(56) References Cited

U.S. PATENT DOCUMENTS

| | | | |
|---|---|---|---|
| 5,870,605 | A | 2/1999 | Bracho |
| 6,021,464 | A | 2/2000 | Yao |
| 6,047,331 | A | 4/2000 | Medard |
| 6,052,683 | A | 4/2000 | Irwin |
| 6,085,320 | A | 7/2000 | Kaliski |
| 6,091,724 | A | 7/2000 | Chandra |
| 6,105,122 | A * | 8/2000 | Muller .................. G06F 15/17 345/472 |
| 6,128,623 | A | 10/2000 | Mattis |
| 6,128,627 | A | 10/2000 | Mattis |
| 6,173,364 | B1 | 1/2001 | Zenchelsky |
| 6,209,003 | B1 | 3/2001 | Mattis |
| 6,226,618 | B1 | 5/2001 | Downs |
| 6,233,617 | B1 | 5/2001 | Rothwein |
| 6,233,646 | B1 | 5/2001 | Hahm |
| 6,289,358 | B1 | 9/2001 | Mattis |
| 6,292,880 | B1 | 9/2001 | Mattis |
| 6,332,158 | B1 | 12/2001 | Risley |
| 6,363,067 | B1 | 3/2002 | Chung |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,775,258 | B1 | 8/2004 | vanValkenburg |
| 6,834,272 | B1 | 12/2004 | Naor |
| 6,862,280 | B1 | 3/2005 | Bertagna |
| 6,901,452 | B1 | 5/2005 | Bertagna |
| 6,915,307 | B1 | 7/2005 | Mattis |
| 6,917,985 | B2 | 7/2005 | Madruga |
| 6,957,228 | B1 | 10/2005 | Graser |
| 6,968,393 | B1 | 11/2005 | Chen |
| 6,981,029 | B1 | 12/2005 | Menditto |
| 7,007,024 | B2 | 2/2006 | Zelenka |
| 7,013,389 | B1 | 3/2006 | Srivastava |
| 7,031,308 | B2 | 4/2006 | Garcia-Luna-Aceves |
| 7,043,637 | B2 | 5/2006 | Bolosky |
| 7,061,877 | B1 | 6/2006 | Gummalla |
| 7,080,073 | B1 | 7/2006 | Jiang |
| RE39,360 | E | 10/2006 | Aziz |
| 7,149,750 | B2 | 12/2006 | Chadwick |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,233,948 | B1 | 6/2007 | Shamoon |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,787 | B1 | 6/2008 | Barnes |
| 7,395,507 | B2 | 7/2008 | Robarts |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,535,926 | B1 | 5/2009 | Deshpande |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,636,767 | B2 | 12/2009 | Lev-Ran |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,769,887 | B1 | 8/2010 | Bhattacharyya |
| 7,779,467 | B2 | 8/2010 | Choi |
| 7,801,069 | B2 | 9/2010 | Cheung |
| 7,801,177 | B2 | 9/2010 | Luss |
| 7,816,441 | B2 | 10/2010 | Elizalde |
| 7,831,733 | B2 | 11/2010 | Sultan |
| 7,873,619 | B1 | 1/2011 | Faibish |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 7,953,885 | B1 | 5/2011 | Devireddy |
| 7,979,912 | B1 | 7/2011 | Roka |
| 8,000,267 | B2 | 8/2011 | Solis |
| 8,010,691 | B2 | 8/2011 | Kollmansberger |
| 8,069,023 | B1 | 11/2011 | Frailong |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,239,331 | B2 | 8/2012 | Shanmugavelayutham |
| 8,271,578 | B2 | 9/2012 | Sheffi |
| 8,271,687 | B2 | 9/2012 | Turner |
| 8,312,064 | B1 | 11/2012 | Gauvin |
| 8,332,357 | B1 | 12/2012 | Chung |
| 8,375,420 | B2 | 2/2013 | Farrell |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 * | 9/2014 | Kim .................. H04L 63/1425 726/22 |
| 8,832,302 | B1 | 9/2014 | Bradford |
| 8,836,536 | B2 | 9/2014 | Marwah |
| 8,861,356 | B2 | 10/2014 | Kozat |
| 8,862,774 | B2 | 10/2014 | Vasseur |
| 8,868,779 | B2 | 10/2014 | ONeill |
| 8,874,842 | B1 | 10/2014 | Kimmel |
| 8,880,682 | B2 | 11/2014 | Bishop |
| 8,903,756 | B2 | 12/2014 | Zhao |
| 8,923,293 | B2 | 12/2014 | Jacobson |
| 8,934,496 | B2 | 1/2015 | Vasseur |
| 8,937,865 | B1 | 1/2015 | Kumar |
| 8,972,969 | B2 | 3/2015 | Gaither |
| 8,977,596 | B2 | 3/2015 | Montulli |
| 9,002,921 | B2 | 4/2015 | Westphal |
| 9,032,095 | B1 | 5/2015 | Traina |
| 9,071,498 | B2 | 6/2015 | Beser |
| 9,112,895 | B1 | 8/2015 | Lin |
| 9,137,152 | B2 | 9/2015 | Xie |
| 9,253,087 | B2 | 2/2016 | Zhang |

(56) References Cited

U.S. PATENT DOCUMENTS

| | | |
|---|---|---|
| 9,270,598 B1 | 2/2016 | Oran |
| 9,280,610 B2 | 3/2016 | Gruber |
| 9,609,014 B2 * | 3/2017 | Solis .................. H04L 45/745 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0238050 A1 | 10/2005 | Pung |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0103896 A1 | 5/2008 | Flake |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |

(56) References Cited

U.S. PATENT DOCUMENTS

| | | |
|---|---|---|
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | ZoltÃ?Âin |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317643 A1* | 12/2012 | Kim ............... H04L 63/1458 726/22 |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |

(56) References Cited

U.S. PATENT DOCUMENTS

| | | |
|---|---|---|
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | Lescouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0341373 A1 | 11/2015 | Solis et al. |
| 2015/0349961 A1 | 12/2015 | Mosko |
| 2015/0372903 A1 | 12/2015 | Hui |
| 2015/0381546 A1 | 12/2015 | Mahadevan |
| 2016/0014234 A1* | 1/2016 | Oran .................... H04L 45/742 709/203 |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2017/0012867 A1* | 1/2017 | Royon .................... H04L 45/42 |
| 2017/0134276 A1* | 5/2017 | White .................... H04L 45/742 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |

(56) References Cited

FOREIGN PATENT DOCUMENTS

| | | | |
|---|---|---|---|
| EP | 2120419 | A2 | 11/2009 |
| EP | 2124415 | A2 | 11/2009 |
| EP | 2214357 | A1 | 8/2010 |
| EP | 2299754 | A1 | 3/2011 |
| EP | 2323346 | | 5/2011 |
| EP | 2533495 | A2 | 12/2012 |
| EP | 2552083 | | 1/2013 |
| EP | 2214356 | | 5/2016 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2005041527 | | 5/2005 |
| WO | 2007113180 | A1 | 10/2007 |
| WO | 2007122620 | | 11/2007 |
| WO | 2007144388 | A1 | 12/2007 |
| WO | 2011049890 | A1 | 4/2011 |
| WO | 2012077073 | A1 | 6/2012 |
| WO | 2013123410 | | 8/2013 |
| WO | 2014023072 | | 2/2014 |
| WO | 2015084327 | | 6/2015 |

OTHER PUBLICATIONS

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]—[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/altachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
International Search Report and Written Opinion in corresponding International Application No. PCT/US2017/026346, dated Jun. 28, 2017, 11 pgs.
Saxena, et al., "Named Data Networking: A Survey", Computer Science Review, XP029469974, ISSN: 1574-0137, Feb. 21, 2016, 41 pgs.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb., 2009).
"PBC Library-Pairing-Based Cryptography-About," http://crypto.stanford.edu/pbc. downloaded Apr. 27, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer ScienceVolume 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).

(56) References Cited

OTHER PUBLICATIONS

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?titleContent_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heal pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CON) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from Hvac Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the

(56) References Cited

OTHER PUBLICATIONS

Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.

(56) References Cited

OTHER PUBLICATIONS

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
C. Gentry and A. Silverberg. Hierarchical ID-Based Cryptography. Advances in Cryptology—ASIACRYPT 2002. Springer Berlin Heidelberg (2002).
Zahariadis, Theodore, et al. "Trust management in wireless sensor networks." European Transactions on Telecommunications 21.4 (2010): 386-395.
Mahadevan, Priya, et al. "Systematic topology analysis and generation using degree correlations." ACM SIGCOMM Computer Communication Review. vol. 36. No. 4. ACM, 2006.
Xiong et al., "CloudSeal: End-to-End Content Protection in Cloud-based Storage and Delivery Services", 2012.
https://code.google.com/p/ccnx-trace/.
Biradar et al., "Review of multicast routing mechanisms in mobile ad hoc networks", Aug. 16, Journal of Network and Computer Applications 35 (2012) 221-229.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Tiancheng Zhuang et al. "Managing Ad Hoc Networks of Smartphones", International Journal of Information and Education Technology, Oct. 1, 2013.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.

* cited by examiner

SHARED PENDING INTEREST TABLE IN A CONTENT CENTRIC NETWORK

RELATED APPLICATIONS

The subject matter of this application is related to the subject matter in the following applications:
- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and
- U.S. patent application Ser. No. 14/595,060, entitled "AUTO-CONFIGURABLE TRANSPORT STACK," by inventors Ignacio Solis and Glenn C. Scott, filed 12 Jan. 2015 (hereinafter "U.S. patent application Ser. No. 14/595,060"); the disclosures of which are herein incorporated by reference in their entirety.

BACKGROUND

Field

This disclosure is generally related to the distribution of digital content. More specifically, this disclosure is related to a shared and distributed pending interest table in a content-centric network.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified by their unique names, which are typically hierarchically structured variable-length identifiers (HSVLI). An HSVLI can include contiguous name components ordered from a most general level to a most specific level.

A CCN node stores an interest in an entry in a pending interest table (PIT), which includes the name and a receiving interface associated with the interest. When the node receives the corresponding content object, the node consumes (i.e., retrieves and removes) the PIT entry and forwards the content object via the interface specified in the PIT entry.

The node can have limited resources (e.g., limited amount of memory) to store its PIT. If the node forwards a large volume of data flow, the node can receive a large number of interests for content objects. As a result, the node's PIT can quickly become full (i.e., the memory available for the PIT is occupied and a new interest cannot be incorporated). The node typically does not accept interests if the local PIT is full. As a result, the node drops any subsequent interests.

SUMMARY

One embodiment provides a pending interest table (PIT) sharing system that facilitates sharing of a PIT. During operation, the system receives, by a local interface, a first message comprising an interest from a node of origin. The hop count for the interest has not been decreased. The system creates an entry, which includes a name of the interest, in a PIT for the interest. If the system receives a content object associated with the name, the system retrieves and removes the entry from the PIT, and sends the content object to the node of origin in a second message.

In a variation on this embodiment, the name of the interest is based on one or more of: a hierarchically structured variable-length identifier (HSVLI), which comprises contiguous name components ordered from a most general level to a most specific level. The HSVLI is applicable in a portal instance corresponding to the stack; a flat name that does not indicate any hierarchy; a role of the component within the stack; and a unique identifier, which is specific to the component of the stack.

In a variation on this embodiment, the first and second messages also include an interface of origin indicating an interface via which the node of origin has received the interest. The entry then further includes an identifier of the interface of origin.

In a further variation, the PIT is a proxy PIT dedicated for interests from the node of origin. The proxy PIT is distinct from a local PIT for interests from a locally coupled device.

In a further variation, the entry also includes an identifier of a tunnel interface of a tunnel coupling the node of origin.

In a variation on this embodiment, the first and second messages are tunnel-encapsulated messages. A respective interface of origin is associated with an individual tunnel.

In a variation on this embodiment, the interest from the node of origin is distinguished from interests from a locally coupled device based on distinct namespaces.

BRIEF DESCRIPTION OF THE FIGURES

In the figures, like reference numerals refer to the same figure elements.

DETAILED DESCRIPTION

Figure 1:
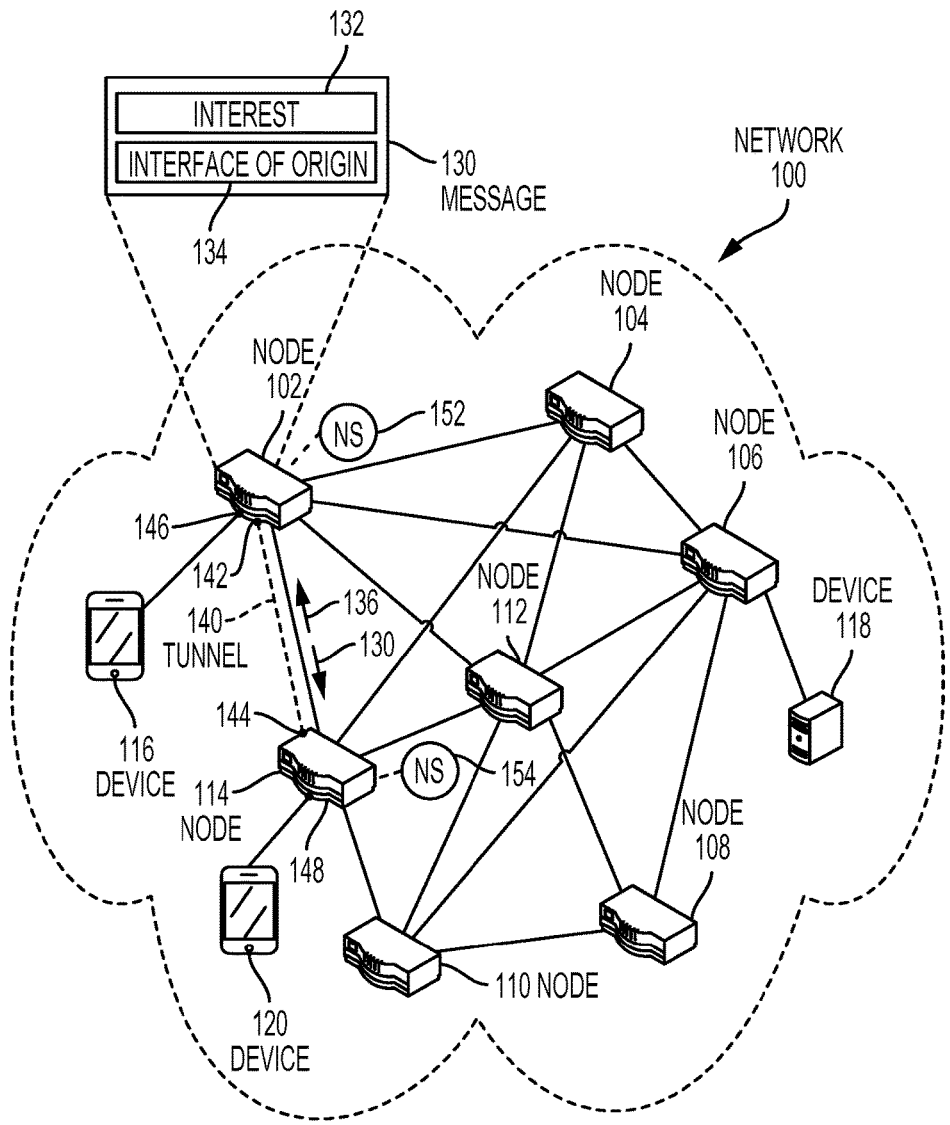
FIG. 1 illustrates an exemplary content-centric network (CCN) that facilitates a shared PIT, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of extending a pending interest table (PIT) by sharing the PIT with a proxy node. With existing technologies, when a CCN node receives a large number of interests, its PIT can become full. As a result, the node drops any subsequent interest until a content object returns. To solve this problem, the node can offload some of the PIT entries to another node, which can be referred to as a proxy node. The proxy node maintains a set of proxy PIT entries for the node (i.e., the node of origin). When the proxy node receives the content object for an interest with a proxy PIT entry, the proxy node forwards the content object to the node.

In some embodiments, the node establishes a tunnel with the proxy node. Upon receiving an interest, the node determines whether the interest should be in a local PIT entry or a proxy PIT entry. The node can allocate different namespace for local and proxy PIT entries. For example, the node can determine that any interest with a prefix "/a/b/" should be in a local PIT entry and any interest with a prefix "/p1/" should be in a proxy PIT entry. Upon determining an interest to be a candidate for a proxy PIT entry, the node sends the interest and an interface of origin (i.e., the interface via which the node has received the interest) to the proxy node via the tunnel. The proxy node then creates a proxy PIT entry (e.g., either in a different proxy PIT or in its local PIT) comprising the name of the interest and the interface of origin. The proxy node then forwards the interest.

When the proxy node receives the content object for the interest, the proxy node retrieves and removes the proxy PIT entry, and sends the content object and the interface of origin back to the node via the tunnel. The node receives the content object and the interface of origin, and forwards the content object via the interface of origin. In this way, the node shares PIT entries with the proxy node, thereby extending the capacity of its PIT. It should be noted that forwarding information via a tunnel includes encapsulating the information in a tunnel encapsulation.

In some embodiments, a PIT operates under the CCN architecture. In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location-independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish among different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "lci" and "ccnx" refer to labeled content information and indicate a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment, which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary content-centric network (CCN) that facilitates a shared PIT, in accordance with an embodiment of the present invention. A network 100, which can be a CCN, can include client devices 116 and 120, a content-producing device 118, and a router or other forwarding device at nodes 102, 104, 106, 108, 110, 112, and 114. A node can be a computer system, an endpoint representing users, and/or a device that can generate interests or originate content. In a CCN network, the interfaces (e.g., on a transport link adapter) are often configured based on configuration files comprising prepared configuration specifications. The configuration of these interfaces is usually modified by explicit administrative commands at runtime. Suppose that peer nodes 102 and 114 are coupled to each other via interface 142 of node 102 and interface 144 of node 114. Devices 116 and 120 are coupled with nodes 102 and 114 via interfaces 146 and 148, respectively.

With existing technologies, when node 102 receives a large number of interests, its PIT can become full. As a result, node 102 drops any subsequent interest from device 116 until a content object returns. To solve this problem, node 102 can offload some of the PIT entries to a proxy node 114. Node 114 maintains a set of proxy PIT entries for node 102. In some embodiments, node 102 establishes a tunnel 140 with node 114 between interfaces 142 and 144. Upon receiving an interest 132 from device 116 via interface 146, node 102 determines whether the interest should be in a local PIT entry or a proxy PIT entry. Node 102 can allocate different namespaces 152 and 154 for local and proxy PIT entries, respectively. For example, the node can allocate namespace 152 as prefix "/a/b/" and namespace 154 as prefix "/p1/." Namespace 154 can be referred to as a proxy namespace.

Suppose that interest 132 is for a content object identified by a name "/p1/q1," which is in namespace 154. As a result, node 102 determines interest 132 to be a candidate for a proxy PIT entry. Node 102 then includes interest 132 and an interface of origin 134 in a message 130, which can be a tunnel message (i.e., a message encapsulated in a tunneling protocol) and sends message 130 via tunnel 140. Message 130 can be referred to as a proxy message. In some embodiments, interface of origin 134 can be an identifier of interface 146. Node 114 receives message 130 and obtains interest 132 and interface of origin 134 by decapsulating message 130. Node 114 creates a proxy PIT entry (e.g., either in a different proxy PIT or in its local PIT) comprising name "/p1/q1" and the identifier of interface 146. The proxy node then forwards interest 132 in network 100.

Suppose that device 118 is the producer of the content object. When device 118 receives interest 132, device 118 sends the content object associated with name "/p1/q1" to node 114. Node 114 receives the content object, and retrieves and removes the proxy PIT entry associated with name "/p1/q1." Node 114 includes the content object and interface of origin 134 in a message 136, which can be an encapsulated message that can be forwarded via a tunnel, and sends message 136 via tunnel 140 to node 102. Node 102 receives message 136, and obtains the content object and interface of origin 134 by decapsulating message 136. Since interface of origin 134 is an identifier of interface 146, node 102 forwards the content object via interface 146 to device 116. In this way, node 102 shares PIT entries with proxy node 114, thereby extending the capacity of node 102's PIT.

It should be noted that even though node 102 is sharing a PIT with node 114, these nodes construct and maintain their own forwarding information base (FIB). Furthermore, the distribution of namespaces 152 and 154 ensures distribution of interests received at node 102 between nodes 102 and 114. However, node 102 remains the node of origin. As a result, in contrast to load balancing techniques, content objects associated with both namespaces 152 and 154 are eventually forwarded to node 102.

Exemplary PIT Sharing

Figure 2A:
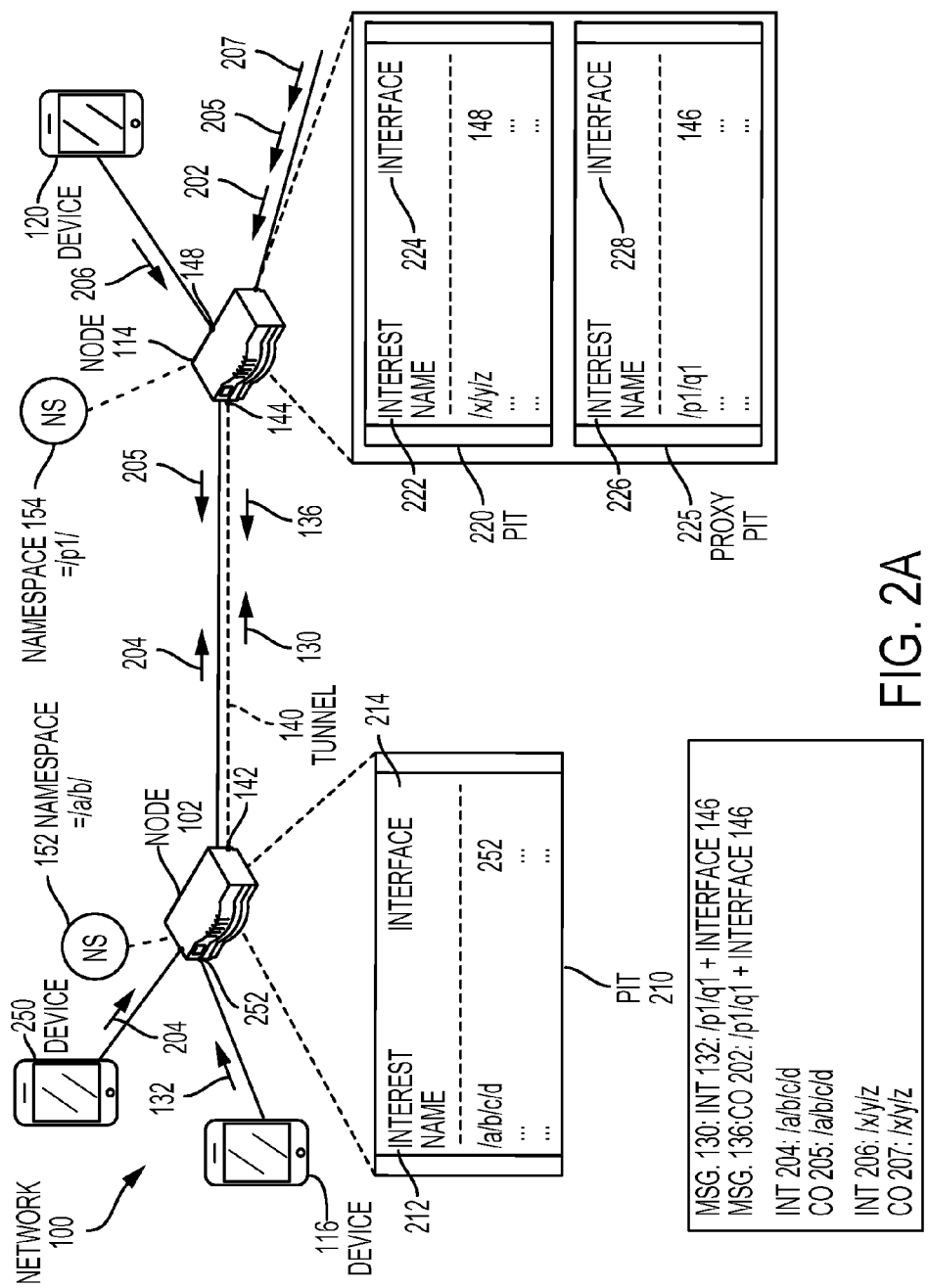
FIG. 2A illustrates an exemplary PIT sharing based on a proxy PIT, in accordance with an embodiment of the present invention.

FIG. 2A illustrates an exemplary PIT sharing based on a proxy PIT, in accordance with an embodiment of the present invention. In this example, device 250 is coupled with node 102 via interface 252. During operation, node 102 receives interests 132 and 204 from devices 116 and 250, respectively. Suppose that interests 132 and 204 are for content objects associated with names "/a/b/c/d" and "/p1/q1," respectively. Similarly, node 114 receives interest 206 from device 120 for a content object associated with name "/x/y/z." Since interest 132 is for a name in namespace 154, node 102 sends message 130 comprising interest 132 and an identifier of interface 146 via tunnel 140 to node 114. While forwarding interest 132 to node 114, node 102 does not decrement the hop count for interest 132 while traversing tunnel 140.

Suppose that node 114, which is the proxy node of node 102, maintains PIT 220 for local entry and proxy PIT 225 for proxy entries. PIT 220 stores an interest name 222 and a local interface 224 via which node 114 has received a local interest. Proxy PIT 225 stores an interest name 226 and an interface of origin 228, which is an interface of node 102. Here, storing an interface indicates storing an identifier of the interface. This identifier can be a local and internal identifier of a node.

Upon receiving message 130, node 114 obtains interest 132 and an identifier of interface 136 by decapsulating message 130. Node 114 determines that name "/p1/q1" in interest 132 is in namespace 154 and hence, should be in a proxy PIT entry. Node 114 then creates an entry in a proxy PIT 225 comprising name "/p1/q1" and the identifier of interface 146. Node 114 then forwards interest 132 in network 100. When node 114 receives a content object 202, node 114 retrieves and removes the proxy PIT entry associated with name "/p1/q1." Node 114 includes content object 202 and the identifier of interface 146 in message 136 and sends message 136 via tunnel 140 to node 102.

Node 102 receives message 136, and obtains content object 202 and the identifier of interface 146 by decapsulating message 136. Since node 102 has received message 136 via tunnel 140, node 102 is aware that message 136 includes a content object and the interface via which content object 202 should be forwarded. In some embodiments, node 102 determines that name "/p1/q1" of content object 202 is in namespace 154 and hence, content object 202 has already "consumed" a proxy PIT entry. Node 102 then forwards content object 202 via interface 146 to device 116 without consulting its local PIT 210. In this way, node 102 uses proxy node 114 to extend the capacity of node 102's PIT while continuing using a local PIT.

However, when node 102 receives interest 204 from device 250, node 102 determines that name "/a/b/c/d" in interest 204 is in namespace 152 and hence, should be in a local PIT entry. Node 102 then creates an entry in PIT 210. PIT 210 stores an interest name 212 and an interface 214.

The entry comprises name "/a/b/c/d" of interest 204 and the identifier of interface 252. Node 102 then forwards interest 204 in network 100. Suppose that node 102 receives a corresponding content object 205 from node 114. Upon receiving content object 205, node 102 determines that name "a/b/c/d" of content object 205 is in namespace 152 and hence, should be processed based on a local PIT entry. Node 102 retrieves and removes the proxy PIT entry associated with name "a/b/c/d" to obtain an identifier of interface 252. Node 102 then forwards content object 205 via interface 252 to device 250.

In the same way, when node 114 receives interest 206 from device 120, node 114 determines that name "/x/y/z" in interest 206 is from a local interface 148 and hence, should be in a local PIT entry. Node 114 then creates an entry in PIT 220 comprising name "x/y/z" and the identifier of interface 148. Node 114 then forwards interest 206 in network 100. Suppose that node 102 receives a corresponding content object 207. Upon receiving content object 207, node 114 determines that name "x/y/z" of content object 207 is not in namespace 154 and hence, should been processed based on a local PIT entry. Node 114 retrieves and removes the PIT entry associated with name "x/y/z" to obtain an identifier of interface 148. Node 114 then forwards content object 207 via interface 148 to device 120.

Figure 2B:
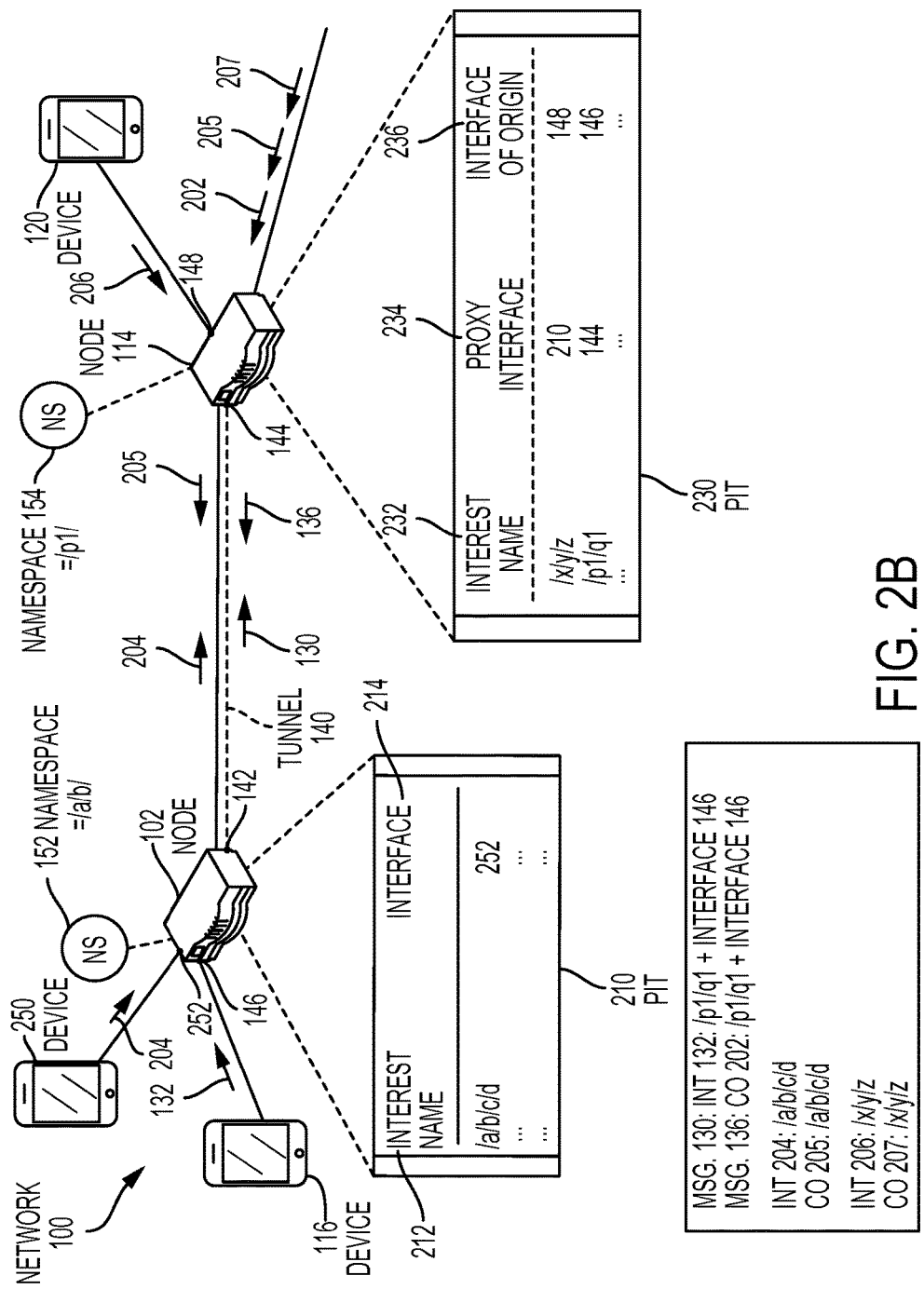
FIG. 2B illustrates an exemplary PIT sharing based on a proxy interface mapping, in accordance with an embodiment of the present invention.

FIG. 2B illustrates an exemplary PIT sharing based on a proxy interface mapping, in accordance with an embodiment of the present invention. In this example, node 114 stores proxy entries and local entries in the same PIT 230. PIT 230 stores an interest name 232, a proxy interface 234 (i.e., the interface via which node 114 has received a proxy message), and an interface of origin 236. Interface of origin 236 represents the interface via which nodes 114 and 102 have received an interest. Here, storing an interface indicates storing an identifier of the interface. In some embodiments, node 114 maintains a mapping between proxy interface 232 and interface of origin 236 in a separate table. PIT 230 then can store an interest name 232 and an interface of origin 236.

If an entry in PIT 230 is a proxy entry, node 114 stores both the proxy interface (i.e., the interface via which node 114 has received a proxy message) and the interface of origin. On the other hand, if an entry in PIT 230 is a local entry, node 114 stores an identifier of the interface via which the interest has been received. In some embodiments, if an entry in PIT 230 is a local entry, node 114 also stores a value indicating that the entry is a local entry. Examples of the value include, but are not limited to, a null value, an empty value (or string), and a value sufficiently distinct from an identifier of an interface.

Upon receiving message 130 via interface 144, node 114 obtains interest 132 and an identifier of interface 136 by decapsulating message 130. Node 114 determines that name "/p1/q1" in interest 132 is in namespace 154 and hence, should be in a proxy entry. Node 114 then creates an entry in PIT 230 comprising name "/p1/q1," the identifier of proxy interface 144, and the identifier of interface 146. Node 114 then forwards interest 132 in network 100. When node 114 receives content object 202, node 114 retrieves and removes the PIT entry associated with name "/p1/q1." Node 114 includes content object 202 and the identifier of interface 146 in message 136 and sends message 136 via proxy interface 144.

On the other hand, when node 114 receives interest 206 from device 120, node 114 determines that name "/x/y/z" in interest 206 is from a local interface 148 and hence, should be in a local PIT entry. Node 114 then creates an entry in PIT 230 comprising name "x/y/z," a value 210, which indicates the PIT entry to be a local PIT entry, and the identifier of interface 148. Here, node 114 can use value 210 in place of a proxy interface value (i.e., in the same column) to use the same PIT for both local and proxy entries. In the same way, node 114 uses the same column to store identifiers of interfaces 146 and 148. Node 114 then forwards interest 206 in network 100. Suppose that node 102 receives a corresponding content object 207. Upon receiving content object 207, node 114 retrieves and removes the PIT entry associated with name "x/y/z" to obtain value 210 and an identifier of interface 148. Node 114 determines that value 210 is present in the entry and hence, the entry is a local entry. Node 114 then forwards content object 207 via interface 148 to device 120.

Figure 2C:
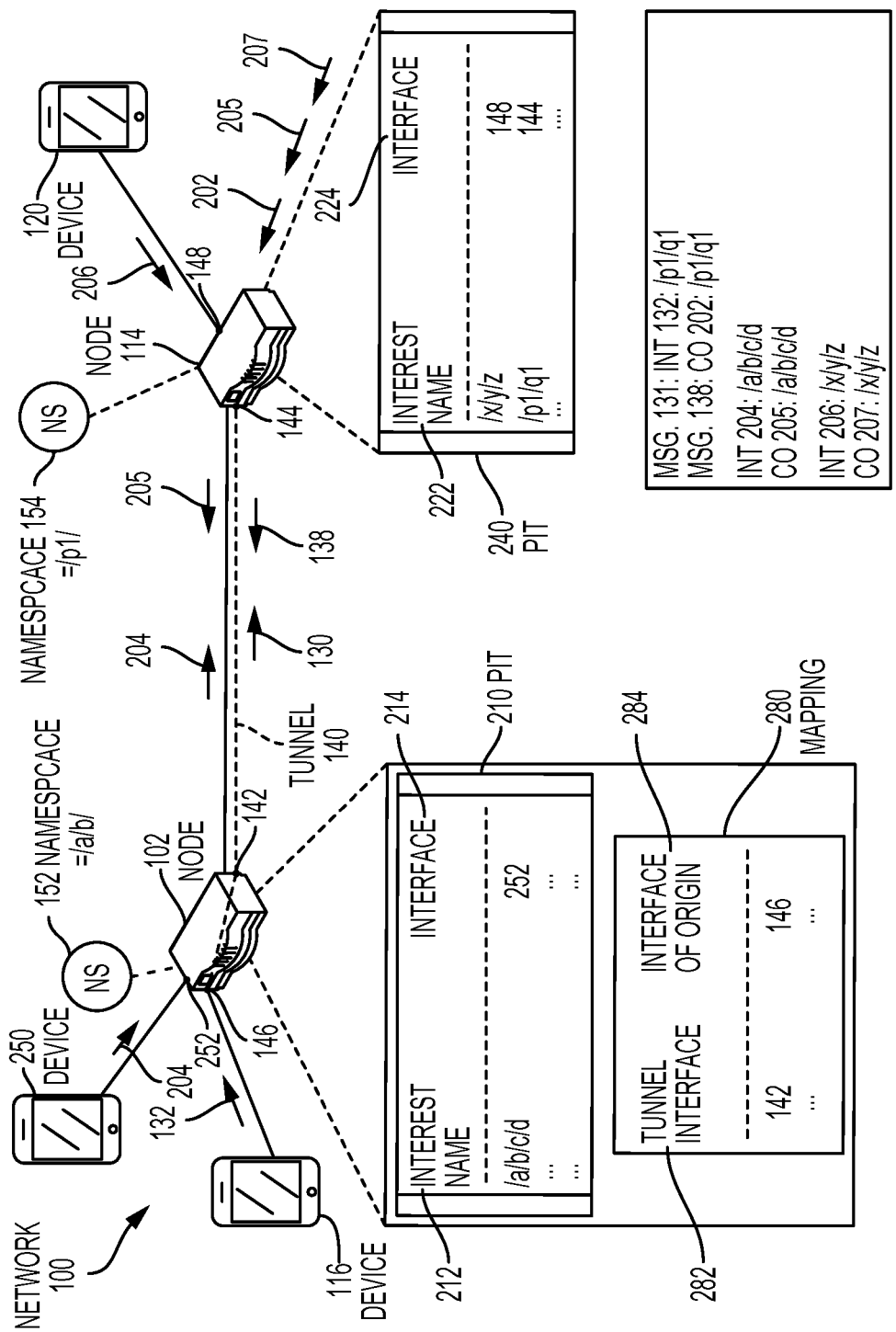
FIG. 2C illustrates an exemplary PIT sharing based on a tunnel mapping, in accordance with an embodiment of the present invention.

FIG. 2C illustrates an exemplary PIT sharing based on a tunnel mapping, in accordance with an embodiment of the present invention. In this example, nodes 102 and 114 maintain a tunnel for a respective interface of origin. For example, tunnel 140 can correspond to interface 146. As a result, when node 102 receives a content object from tunnel 140 via interface 142, node 102 forwards that content object via interface 146. In some embodiments, node 102 maintains a mapping 280 between a tunnel interface 282 and an interface of origin 284. Mapping 280 includes a mapping between interface 142 and interface 146.

Since node 102 maintains mapping 280, node 114 stores proxy entries and local entries in the same PIT 240. PIT 240 stores an interest name 242 and an interface 244. Interface 244 represents the local interface via which node 114 has received an interest or a proxy message. Here, storing an interface indicates storing an identifier of the interface. In this example, node 102 encapsulates interest 132 in message 131 and forwards message 131 via interface 142. Upon receiving message 131 via interface 144, node 114 obtains interest 132 by decapsulating message 131. Node 114 then creates an entry in PIT 240 comprising name "/p1/q1" and the identifier of interface 144 via which node 114 has received interest 132. Node 114 then forwards interest 132 in network 100. When node 114 receives content object 202, node 114 retrieves and removes the PIT entry associated with name "/p1/q1." Node 114 includes content object 202 in message 138 and sends message 138 via obtained interface 144.

Upon receiving message 138 via interface 142, node 102 decapsulates message 138 to obtain content object 202. Node 102 determines that message 138 is received via tunnel 140 and hence, is from a proxy node. In some embodiments, node 102 determines that name "/p1/q1" of content object 202 is in namespace 154 and hence, content object 202 has already "consumed" a proxy PIT entry. Node 102 then looks up interface 142 in mapping 280 to obtain interface 146 as the interface via which content object 202 should be forwarded. Node 102 then forwards content object 202 via interface 146 to device 116 without consulting its local PIT 210.

Forwarding Interest to the Proxy Node

Figure 3:
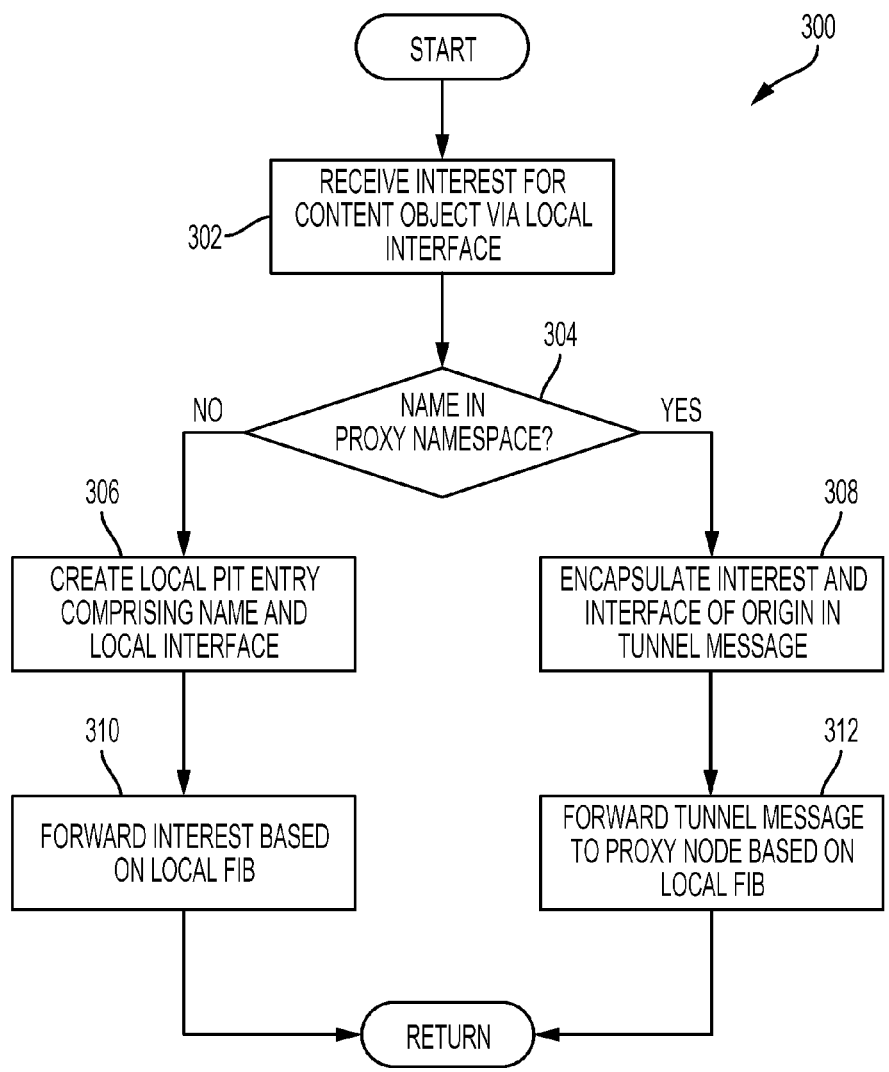
FIG. 3 presents a flow chart illustrating a method for offloading an interest to a proxy node, in accordance with an embodiment of the present invention.

When node 102 forwards interest 132 to node 114, node 102 uses tunnel 140 to forward interest 132. FIG. 3 presents a flow chart 300 illustrating a method for offloading an interest to a proxy node, in accordance with an embodiment of the present invention. During operation, a node of origin receives an interest for a content object via a local interface (operation 302). The node determines whether the name of the content object is in a proxy namespace (operation 304). The proxy namespace determines whether interests corresponding to the namespace should be forwarded to a proxy node.

If the name is not in the proxy namespace, the node creates a local PIT entry comprising the name and the local interface (operation 306). The node then forwards the interest based on the local FIB (operation 310). If the name is in the proxy namespace, the node encapsulates the interest and an interface of origin, which is the local interface, in a tunnel message (operation 308). The node may not include the interface of origin in the tunnel message if the node maintains a tunnel mapping, as described in conjunction with FIG. 2C. The node then forwards the tunnel message to the proxy node based on the local FIB (operation 310). It should be noted that the local interface is represented in a PIT entry or the tunnel message by an identifier of the local interface.

Operations of the Proxy Node

Figure 4A:
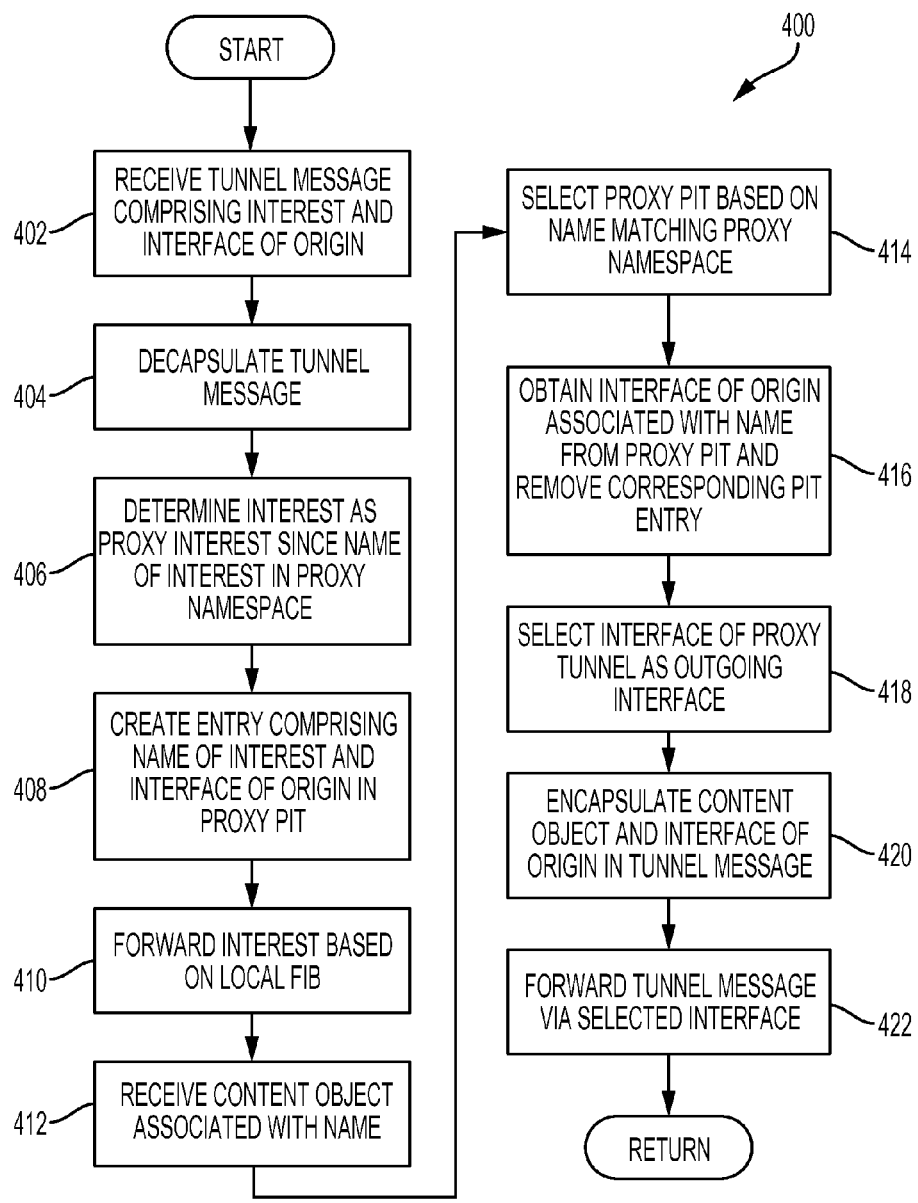
FIG. 4A presents a flow chart illustrating a method of a proxy node sharing a PIT based on a proxy PIT, in accordance with an embodiment of the present invention.

FIG. 4A presents a flow chart 400 illustrating a method of a proxy node sharing a PIT based on a proxy PIT, in accordance with an embodiment of the present invention. During operation, a proxy node receives a tunnel message comprising an interest and an interface of origin (operation 402). The node decapsulates the tunnel message (operation 404) and determines the interest as a proxy interest since the name of the interest is in a proxy namespace (operation 406). The node creates an entry comprising the name of the interest and the interface of origin obtained from the message in a proxy PIT (operation 408). The node then forwards the interest based on a local FIB (operation 410).

This interest travels though the network and the corresponding content object comes back to the node. The node receives the content object associated with the name (operation 412) and selects the proxy PIT based on the name matching a proxy namespace (operation 414). The node obtains the interface of origin associated with the name from the proxy PIT and removes the corresponding PIT entry (operation 416). Since the name is in the proxy namespace, the node selects the interface of the proxy tunnel as the outgoing interface (operation 418). The node encapsulates the content object and the interface of origin in a tunnel message (operation 420) and forwards the tunnel message via the selected interface (operation 422).

Figure 4B:
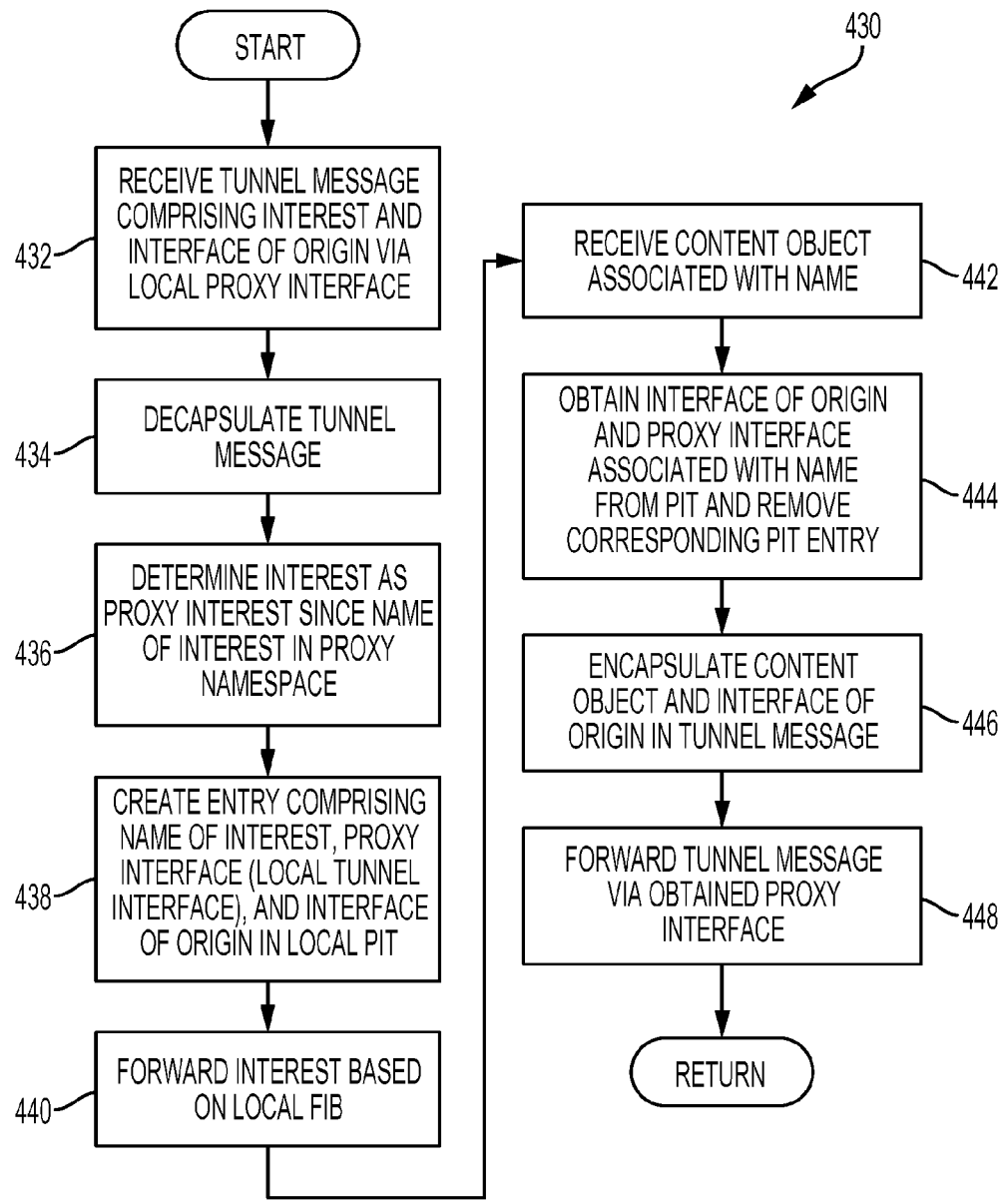
FIG. 4B presents a flow chart illustrating a method of a proxy node sharing a PIT based on a proxy interface mapping, in accordance with an embodiment of the present invention.

FIG. 4B presents a flow chart 430 illustrating a method of a proxy node sharing a PIT based on a proxy interface mapping, in accordance with an embodiment of the present invention. During operation, a proxy node receives a tunnel message comprising an interest and an interface of origin via a local proxy interface (operation 432). The node decapsulates the tunnel message (operation 434) and determines the interest as a proxy interest since the name of the interest is in a proxy namespace (operation 436). The node creates an entry comprising the name of the interest, the proxy interface (the local tunnel interface), and the interface of origin in the local PIT (operation 438). If the entry is not a proxy entry, an entry can include the name of the interest, the interface of origin, and a value indicating the entry to be a local entry. The node then forwards the interest based on a local FIB (operation 440).

This interest travels though the network and the corresponding content object comes back to the node. The node receives the content object associated with the name (operation 442). The node obtains the interface of origin and the proxy interface associated with the name from the PIT and removes the corresponding PIT entry (operation 444). Since the name is in the proxy namespace, the node determines the interface of the proxy tunnel to be the outgoing interface. The node encapsulates the content object and the interface of origin in a tunnel message (operation 446) and forwards the tunnel message via the obtained proxy interface (operation 448).

Figure 4C:
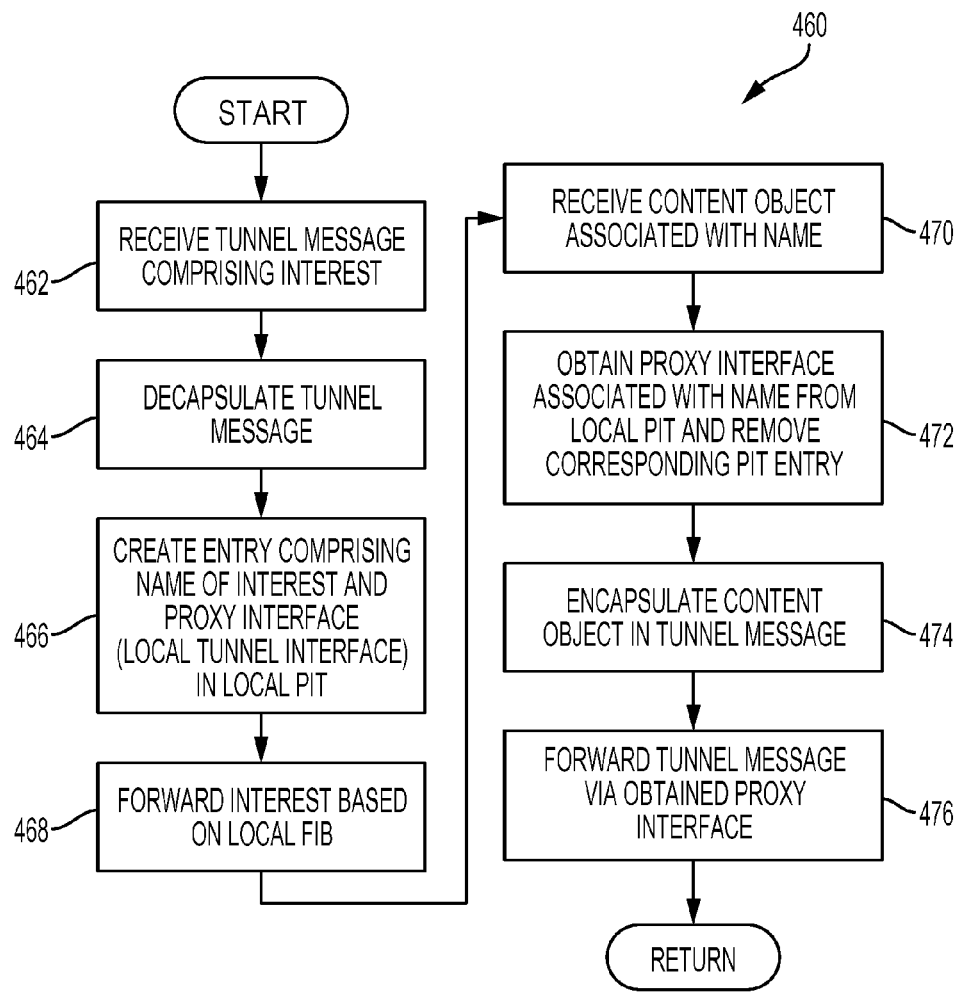
FIG. 4C presents a flow chart illustrating a method of a proxy node sharing a PIT based on a tunnel mapping at a node of origin, in accordance with an embodiment of the present invention.

FIG. 4C presents a flow chart 460 illustrating a method of a proxy node sharing a PIT based on a tunnel mapping at a node of origin, in accordance with an embodiment of the present invention. During operation, a proxy node receives a tunnel message comprising an interest via a local proxy interface (operation 462). The node decapsulates the tunnel message (operation 464) and creates an entry comprising the name of the interest and the proxy interface (the local tunnel interface) in the local PIT (operation 466). The node then forwards the interest based on a local FIB (operation 468).

This interest travels though the network and the corresponding content object comes back to the node. The node receives the content object associated with the name (operation 470). The node obtains the proxy interface associated with the name from the PIT and removes the corresponding PIT entry (operation 472). The node encapsulates the content object in a tunnel message (operation 474) and forwards the tunnel message via the obtained proxy interface (operation 476).

Forwarding Content Object

Figure 5A:
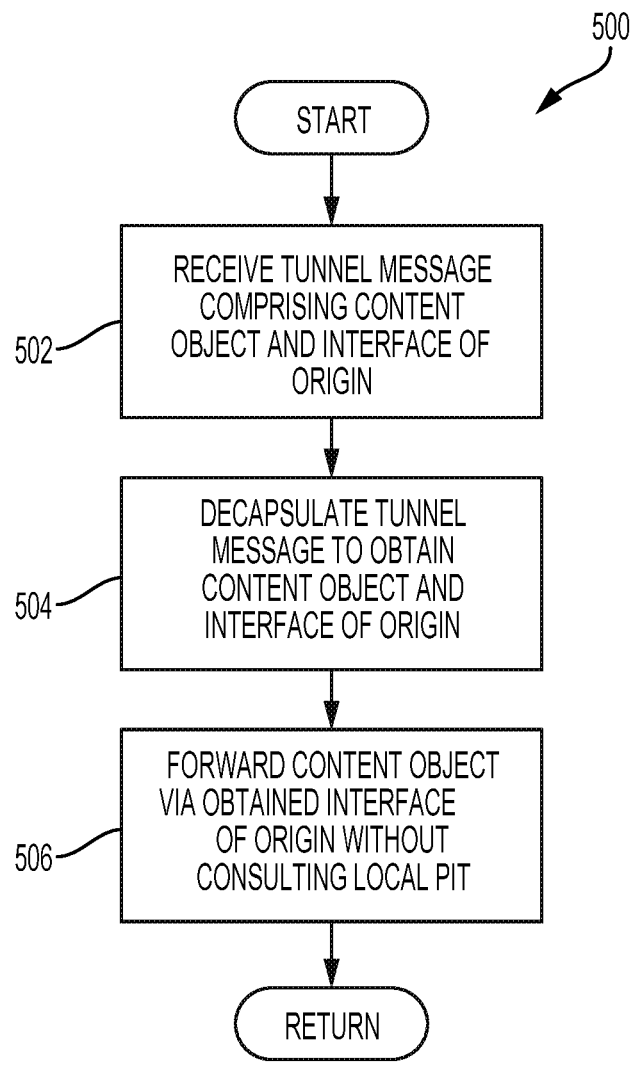
FIG. 5A presents a flow chart illustrating a method for forwarding a content object based on PIT sharing, in accordance with an embodiment of the present invention.

FIG. 5A presents a flow chart 500 illustrating a method for forwarding a content object based on PIT sharing, in accordance with an embodiment of the present invention. During operation, a node of origin receives a tunnel message comprising the content object and the interface of origin (operation 502). The node decapsulates the tunnel message to obtain the content object and the interface of origin (operation 504). The node then forwards the content object via the obtained interface of origin without consulting the local PIT (operation 506).

Figure 5B:
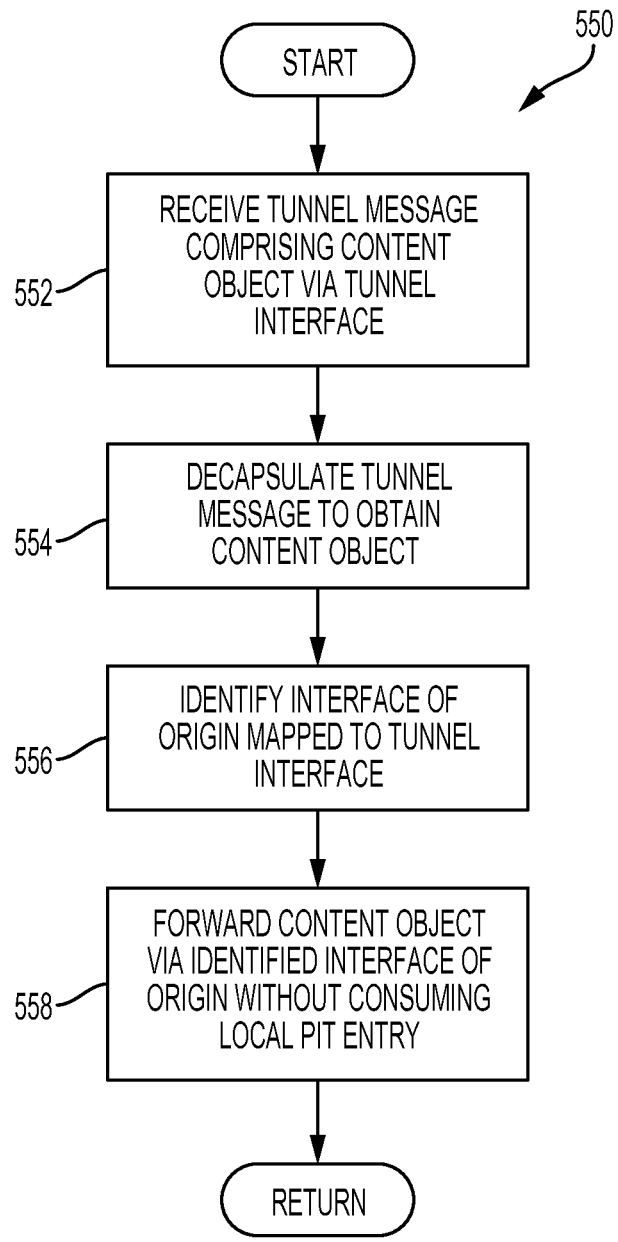
FIG. 5B presents a flow chart illustrating a method for forwarding a content object based on PIT sharing and a tunnel mapping, in accordance with an embodiment of the present invention.

FIG. 5B presents a flow chart 550 illustrating a method for forwarding a content object based on PIT sharing and a tunnel mapping, in accordance with an embodiment of the present invention. During operation, a node of origin receives a tunnel message comprising the content object (operation 552). The node decapsulates the tunnel message to obtain the content object (operation 554). The node identifies the interface of origin mapped to the tunnel interface (operation 556). The node then forwards the content object via the identified interface of origin without consulting the local PIT (operation 558).

Exemplary Apparatus and Computer System

Figure 6:
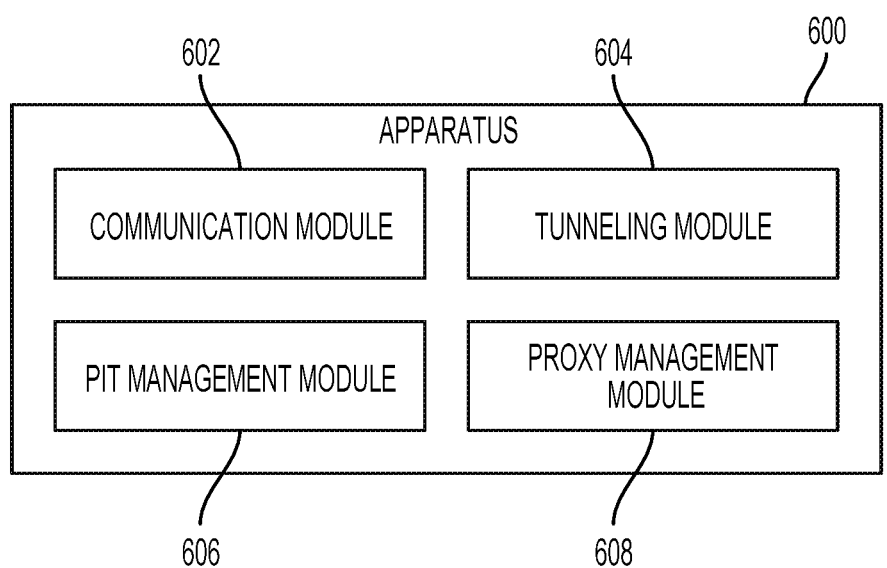
FIG. 6 illustrates an exemplary apparatus that facilitates PIT sharing, in accordance with an embodiment of the present invention.

FIG. 6 illustrates an exemplary apparatus that facilitates PIT sharing, in accordance with an embodiment of the present invention. Apparatus 600 can comprise a plurality of modules, which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device that is capable of communicating with other computer systems and/or devices. Specifically, apparatus 600 can comprise a communication module 602, a tunneling module 604, a PIT management module 606, and a proxy management module 608.

In some embodiments, communication module 602 can send and/or receive data packets to/from other network nodes across a computer network, such as a content-centric network. Communication module 602 can create, send. and receive tunnel-encapsulated messages. Such messages can include one or more of: an interest, a content object, an interface of origin, and a proxy interface. Tunneling module 604 can encapsulate a notification message in a tunnel encapsulation (e.g., based on a tunneling protocol).

PIT management module 606 allows apparatus 600 to operate as a proxy node. PIT management module 606 maintains and manages proxy entries in a PIT (either in a separate or a combined PIT) for interests from a node of origin. Proxy management module 608 allows apparatus 600 to operate as a node of origin. Proxy management module 608 determines a proxy node and a proxy namespace. PIT management module 606 also determines whether a name is in a proxy namespace. In some embodiments, proxy management module 608 maintains a mapping between a tunnel interface and an interface of origin.

Figure 7:
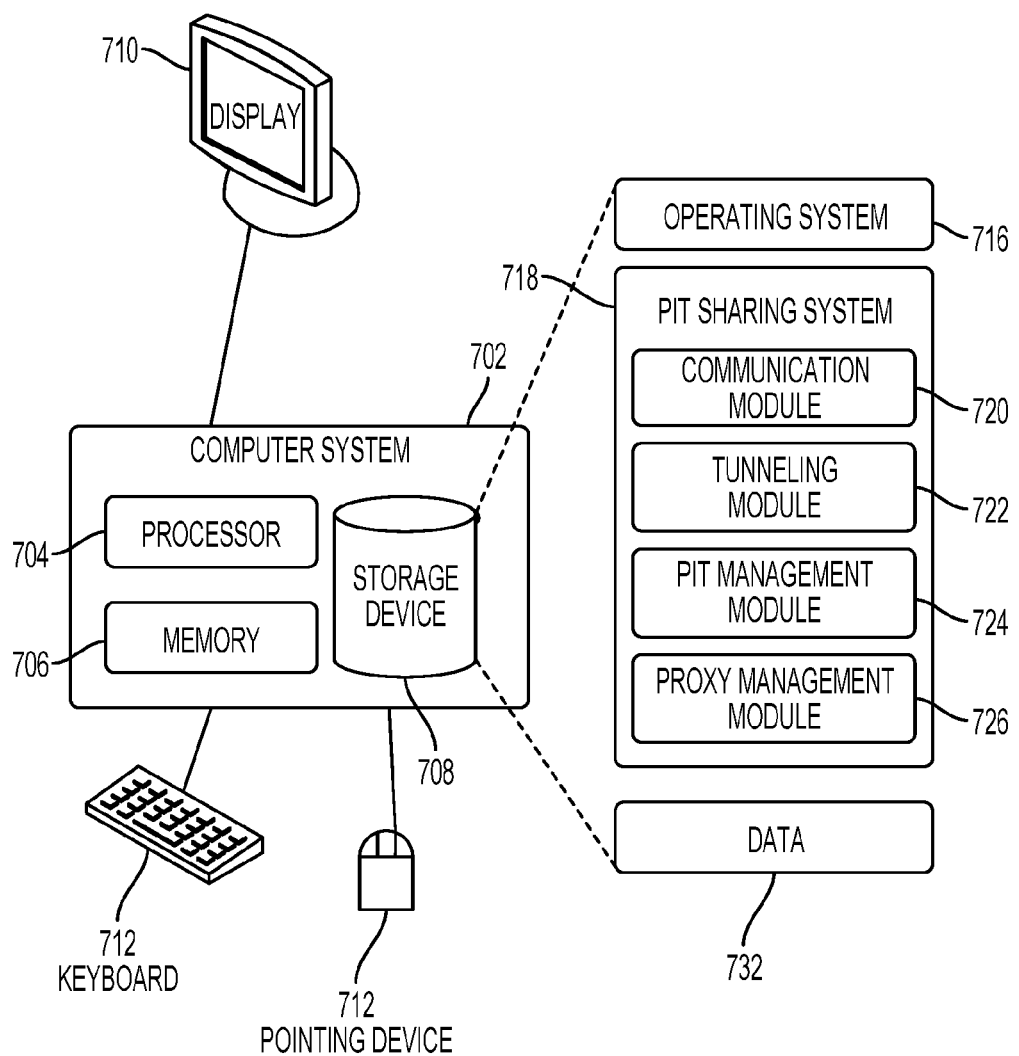
FIG. 7 illustrates an exemplary computer system that facilitates PIT sharing, in accordance with an embodiment of the present invention.

FIG. 7 illustrates an exemplary computer system that facilitates PIT sharing, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a PIT sharing system 718, and data 732.

PIT sharing system 718 can include instructions, which when executed by computer system 702, can cause computer system 702 to perform methods and/or processes described in this disclosure. Specifically, PIT sharing system 718 may include instructions for sending and/or receiving data packets to/from other network nodes across a computer network, such as a content-centric network (communication module 720). Further, PIT sharing system 718 may include instructions for sending and/or receiving data packets to/from other network nodes across a computer network, such as a content-centric network. This packet can be an encapsulated message.

PIT sharing system 718 can include instructions for encapsulating a notification message in a tunnel encapsulation (e.g., based on a tunneling protocol) (tunneling module 722). PIT sharing system 718 can also include instructions for maintaining and managing proxy entries in a PIT (either in a separate or a combined PIT) for interests from a node of origin (PIT management module 724). In addition, PIT sharing system 718 can include instructions for determining whether a name is in a proxy namespace (PIT management module 724). Furthermore, PIT sharing system 718 can also include instructions for a proxy node and a proxy namespace, and for maintaining a mapping between a tunnel interface and an interface of origin (proxy management module 726).

Data 732 can include any data that is required as input or that is generated as output by the methods and/or processes described in this disclosure. Specifically, data 732 can store one or more PITs and a mapping. Data 732 can also include an FIB of computer system 702.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method performed in a content-centric network, comprising:
receiving, by a local interface, a first message comprising an interest from a node of origin, wherein a hop count for the interest has not been decreased;
creating an entry in a proxy pending interest table (PIT) for the interest, wherein the entry comprises a name of the interest, and wherein the proxy PIT is distinct from a local PIT for interests from a locally coupled device; and
in response to receiving a content object associated with the name,
retrieving and removing the entry from the proxy PIT; and
sending the content object to the node of origin in a second message.

2. The method of claim 1, wherein the name of the interest is based on one or more of:
a hierarchically structured variable-length identifier (HSVLI), which comprises contiguous name components ordered from a most general level to a most specific level, wherein the HSVLI is applicable in a portal instance corresponding to the stack;
a flat name that does not indicate any hierarchy;
a role of the component of the stack; and
a unique identifier, which is specific to the component of the stack.

3. The method of claim 1, wherein the first and second messages further comprise an interface of origin indicating an interface via which the node of origin has received the interest; and
wherein the entry further comprises an identifier of the interface of origin.

4. The method of claim 3, wherein the proxy PIT is dedicated for interests from the node of origin.

5. The method of claim 3, wherein the entry further comprises an identifier of a tunnel interface of a tunnel coupling the node of origin.

6. The method of claim 1, wherein the first and second messages are tunnel-encapsulated messages, and wherein a respective interface of origin is associated with an individual tunnel.

7. The method of claim 1, wherein the interest from the node of origin is distinguished from interests from a locally coupled device based on distinct namespaces.

8. A non-transitory computer-readable storage medium storing instructions that when executed by a computer cause the computer to perform a method performed in a content-centric network, the method comprising:
    receiving, by a local interface, a first message comprising an interest from a node of origin, wherein a hop count for the interest has not been decreased;
    creating an entry in a proxy pending interest table (PIT) for the interest, wherein the entry comprises a name of the interest, and wherein the proxy PIT is distinct from a local PIT for interests from a locally coupled device; and
    in response to receiving a content object associated with the name,
        retrieving and removing the entry from the proxy PIT; and
        sending the content object to the node of origin in a second message.

9. The storage medium of claim 8, wherein the name of the interest is based on one or more of:
    a hierarchically structured variable-length identifier (HSVLI), which comprises contiguous name components ordered from a most general level to a most specific level, wherein the HSVLI is applicable in a portal instance corresponding to the stack;
    a flat name that does not indicate any hierarchy;
    a role of the component of the stack; and
    a unique identifier, which is specific to the component of the stack.

10. The storage medium of claim 8, wherein the first and second messages further comprise an interface of origin indicating an interface via which the node of origin has received the interest; and
    wherein the entry further comprises an identifier of the interface of origin.

11. The storage medium of claim 10, wherein the proxy PIT is dedicated for interests from the node of origin.

12. The storage medium of claim 11, wherein the entry further comprises an identifier of a tunnel interface of a tunnel coupling the node of origin.

13. The storage medium of claim 8, wherein the first and second messages are tunnel-encapsulated messages, and wherein a respective interface of origin is associated with an individual tunnel.

14. The storage medium of claim 8, wherein the interest from the node of origin is distinguished from interests from a locally coupled device based on distinct namespaces.

15. A computer system for facilitating forwarding of packets in a content-centric network, the system comprising:
    a processor; and
    a storage device storing instructions that when executed by the processor cause the processor to perform a method, the method comprising:
        receiving, by a local interface, a first message comprising an interest from a node of origin, wherein a hop count for the interest has not been decreased;
        creating an entry in a proxy pending interest table (PIT) for the interest, wherein the entry comprises a name of the interest, and wherein the proxy PIT is distinct from a local PIT for interests from a locally coupled device; and
        in response to receiving a content object associated with the name,
            retrieving and removing the entry from the proxy PIT; and
            sending the content object to the node of origin in a second message.

16. The computer system of claim 15, wherein a name of the interest is based on one or more of:
    a hierarchically structured variable-length identifier (HSVLI), which comprises contiguous name components ordered from a most general level to a most specific level, wherein the HSVLI is applicable in a portal instance corresponding to the stack;
    a flat name that does not indicate any hierarchy;
    a role of the component of the stack; and
    a unique identifier, which is specific to the component of the stack.

17. The computer system of claim 15, wherein the first and second messages further comprise an interface of origin indicating an interface via which the node of origin has received the interest; and
    wherein the entry further comprises an identifier of the interface of origin.

18. The computer system of claim 17, wherein the proxy PIT is dedicated for interests from the node of origin.

19. The computer system of claim 17, wherein the entry further comprises an identifier of a tunnel interface of a tunnel coupling the node of origin.

20. The computer system of claim 15, wherein the interest from the node of origin is distinguished from interests from a locally coupled device based on distinct namespaces.

* * * * *